United States Patent Office 3,413,477
Patented Nov. 26, 1968

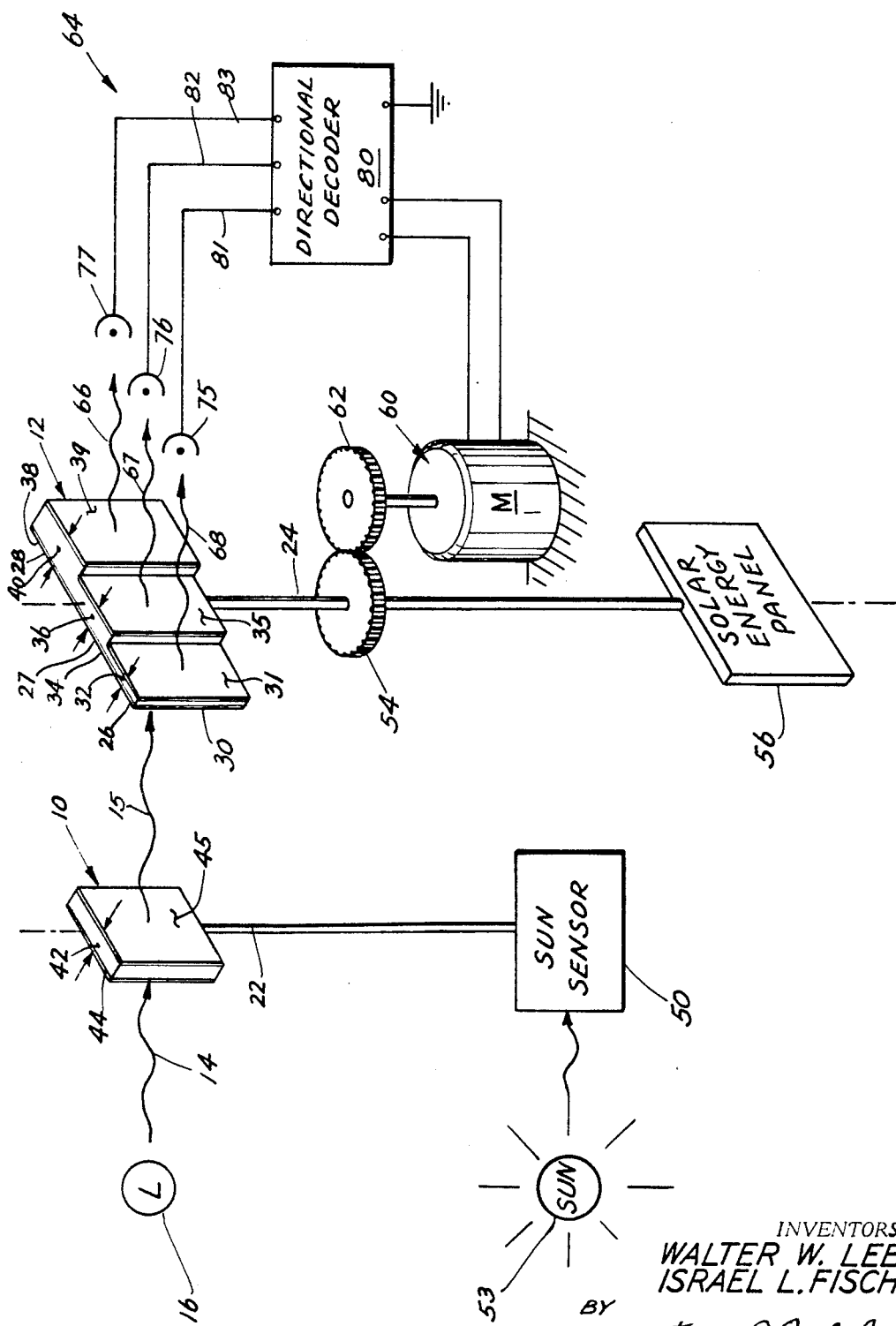

3,413,477
LIGHT FOLLOWER SYSTEM UTILIZING MONOCHROMATIC FILTER MEANS
Israel L. Fischer, Harrington Park, and Walter W. Lee, Allendale, N.J., assignors to The Bendix Corporation, Teterboro, N.J., a corporation of Delaware
Filed Dec. 21, 1965, Ser. No. 524,669
12 Claims. (Cl. 250—203)

ABSTRACT OF THE DISCLOSURE

An optical shaft follower system including a light source and an interference filter means angular movable relative one to the other for transmitting monochromatic light of a wave length corresponding to its position relative to the light source, together with an element movable with one of said means, another filter means angularly movable relative to the interference filter means for selectively passing the monochromatic light received from the interference filter depending on the relative angular position of the other filter means to the interference filter means, and positioning means for positioning the other filter means relative to the interference filter means in a sense to follow the movement of the element.

---

This invention relates to optical means for controlling the angular position of one object relative to a second object, and more particularly to such optical means utilizing an interferometric encoder.

Heretofore, the prior art included synchro transmitters and followers with moving parts utilizing electrical interconnections. The information carrying capability of such systems is limited because the electrical connections are limited as to the number of information signals they can carry and in addition, radio frequency interference effects the accuracy of the system.

As more fully described in a now abandoned application Ser. No. 344,881 filed Feb. 14, 1964, by Walter W. Lee and assigned to The Bendix Corporation, assignee of the present application, the interference filter disclosed therein receive light from a light source and produces monochromatic light which is a function of the angle of incidence of the light from the source on the filter. In the present invention, filter means is provided to analyze the monochromatic light from the filter and signals corresponding to the wave length of the monochromatic light operate repositioning means to drive the filter means to null position relative to the filter.

One object of the present invention is to provide a follower system of greater simplicity and higher accuracy than used heretofore.

Another object of this invention is to provide an optical follower system free of radio frequency interference.

A further object of this invention is to provide economical means for controlling the position of one object relative to a second object.

An additional object of this invention is to provide an optical follower system of small size and weight.

These and other objects and features of the invention are pointed out in the following description in terms of the embodiment thereof which is shown in the accompanying drawing. It is to be understood, however, that the drawing is for the purpose of illustration only and is not a definition of the limits of the invention, reference being had to the appended claims for this purpose.

In the drawing:

The single figure of the drawing shows a novel optical follower system constructed in accordance with the invention.

The invention contemplates a follower system comprising a light source, a movable first filter receiving light from the source and transmitting monochromatic light of a wave length corresponding to the angle of incidence of light from the source, movable filter means arranged to follow the first filter and optically associated with the first filter and receiving the monochromatic light therefrom, said filter means having at least second and third filters passing monochromatic light of different wave lengths, the wave lengths of the monochromatic light passed by each of the second and third filters depending on the angle of incidence of the monochromatic light from the first filter and the position of the filter means relative to the first filter, the second and third filters being arranged to pass monochromatic light of higher and lower wave lengths than the first filter when the filter means is properly positioned relative to the first filter, and positioning means receiving light from the filter means and properly positioning the filter means so that neither the second or third filter passes monochromatic light to the positioning means.

Referring to the drawing, a filter 10 receives light beams 14 from a conventional type of polychromatic light means or source 16. The filter 10 carried by a shaft 22 passes monochromatic light 15 of a wave length corresponding to the angle of incidence of light beams 14 from the polychromatic light means or source 16. Filter means 12 includes filters 26, 27 and 28 and each filter passes monochromatic light of a different wave length, the wave length depending on the angle of incidence of monochromatic light 15 on filter means 12.

The relationship between the wave length $\lambda$ and angle of incidence $\theta$ is given by the following equation:

(1) $$\lambda = 2D \cos \theta$$

where:
D—the distance between filter plates referred to hereinafter.

In a preferred embodiment of the invention, filter 10 is identical to filter 27 so that monochromatic light 15 passed by filter 10 will also pass through filter 27 when the angle of incidence of monochromatic light 15 on filter 27 is equal to the angle of incidence of light 14 on filter 10. Filter 26 of filter means 12 passes monochromatic light of shorter wave length and filter 28 passes monochromatic light of longer wave length than filter 27.

Filter 10 includes plates 44, 45 separated by a spacer 42, filter 26 includes plates 30, 31 separated by a spacer 32, filter 27 includes plates 34, 35 separated by a spacer 36 and filter 28 includes plates 38, 39 separated by a spacer 40.

Filter 10 is mounted on the shaft 22 angularly controlled by a sun sensor 50 carried by a gimbal 52 of a conventional gyroscope having a gyro sensor 50 is always directed towards the rotor 51 and so arranged that the sun 53 and moves the shaft 22 accordingly. Filter means 12 is mounted on a shaft 24 supporting a solar energy panel 56 which is to be directed toward sun 53 to receive maximum radiation from the sun. As sun sensor 50 follows the sun 53 in conventional manner, filter 10 is angularly positioned by the shaft 22 to provide monochromatic light 15 corresponding to its angular position and filter means 12 receives the monochromatic light 15 and is aligned parallel to filter 10 in the manner described hereinafter so that solar energy panel 56 is directed toward sun 53.

Positioning means 64 for aligning filter means 12 with filter 10 includes a photocell 75 receiving monochromatic light 68 passed by filter 26, a photocell 76 receiving monochromatic light 67 passed by filter 27, and a photocell 77 receiving monochromatic light 66 passed by filter 28. Photocells 75, 76 and 77 provide electrical signals corresponding to the wave length of monochromatic light 15 from filter 10. A directional decoder 80 is connected to photocells 75, 76 and 77 and provides an output to a motor 60 for driving the motor in one direction or the other. Motor 60 drives shaft 24 through a gear 62 on the motor meshing with a gear 54 on shaft 24.

The novel optical follower system constructed according to the invention operates as follows:

Sun sensor 50 follows sun 53 and positions filter 10 relative to light source 16 accordingly. Filter 10 preferably is positioned so that the angle of incidence of light 14 is substantially less than 90 degrees. Filter 10 provides monochromatic light 15 of a wave length corresponding to the angle of incidence of light 14 from the source in accordance with Equation 1, above. Either filter 26, 27 or 28 passes monochromatic light 14 depending on the angle of incidence of monochromatic light 14 relative to filter means 12.

When filter 26 passes monochromatic light 15, then photocell 75 is energized and provides a signal to directional decoder 80 which provides an output to energize motor 60 and drive filter means 12 in one direction to align the filter means with filter 10, whereupon filter 27 passes monochromatic light 15 and energizes photocell 76. Energization of photocell 76 provides zero output of directional decoder 80. When filter 28 passes monochromatic light 15 to photocell 77, photocell 77 is energized and provides a signal to directional decoder 80 which provides an output to energize motor 60 to drive filter means 12 in an opposite direction into alignment with filter 10, whereupon filter 27 passes monochromatic light 15 to photocell 26 and the motor is de-energized. With this arrangement, solar energy panel 56 is always directed to sun 53 to receive maximum radiation from the sun.

In some instances it may be desirable to utilize only two filters 26 and 28 of filter means 12 so that monochromatic light 15 is prevented from passing to photocells 75 and 77 when filter 10 and filter means 12 are properly positioned with respect to one another. In the arrangement described, filter 27 of filter means 12 passes monochromatic light 15 to photocell 76 only when filter 10 and filter means 12 are properly aligned, and provides an electrical signal indicating proper alignment.

While the system described provides for movement through an angle of substantially 90 degrees, the system may be used for angles of substantially 180 degrees by utilizing a second system wherein a filter similar to filter 10 and filter means similar to filter means 12 are positioned on shafts 22 and 24, respectively, at right angles to filter 10 and filter means 12. Also, while the system described positions solar energy panel 56 about one axis, a system similar to the one described herein may be utilized to position solar energy panel 56 about a second axis at right angles thereto.

The follower system described herein is simple in construction, highly accurate, and of small size and weight. The system is economical to manufacture and free of radio frequency interference.

Although only one embodiment of the invention has been illustrated and described, various changes in the form and relative arrangements of the parts, which will now appear to those skilled in the art may be made without departing from the scope of the invention. Reference is, therefore, to be had to the appended claims for a definition of the limits of the invention.

What is claimed is:

1. A follower system comprising a light source, a movable first filter receiving light from the source and transmitting monochromatic light of a wave length corresponding to its position relative to the source, movable filter means arranged to follow the first filter and optically associated with the first filter and receiving the monochromatic light therefrom, said filter means having second and third filters respectively passing the monochromatic light of different wave lengths depending on the respective positions of the second and third filters relative to the first filter, and positioning means receiving light from the second and third filters for moving the filter means so as to terminate the passing of the monochromatic light through the second and third filters to the positioning means.

2. A follower system as defined in claim 1 including means for positioning the first filter in response to a condition.

3. The follower system as defined in claim 1 in which the means for moving the first filter responds to the sun and the follower system includes a solar energy panel movable with the filter means and arranged so that when the filter means is properly positioned relative to the first filter, the solar energy panel receives maximum radiation from the sun.

4. A follower system as defined in claim 1 in which the positioning means includes a light sensitive sensor optically associated with each of the second and third filters to receive light therefrom and provide error signals when the filter means is improperly positioned, and motor means responsive to the error signals and drivably connected to the filter means for positioning the filter means to the proper position to null the error signal.

5. A follower system as defined in claim 4 in which the light sensitive sensor is a photocell.

6. The follower system as defined in claim 5 wherein the positioning means includes a decoder connected to the photocells and provides an output corresponding to the error signals and a motor energized by the decoder output and drivably connected to the filter means for driving the filter means to null the error signal.

7. A follower system comprising a light source, a movable first filter receiving light from the source and transmitting monochromatic light of a wave length corresponding to the angle of incidence of light from the source, movable filter means arranged to follow the first filter and optically associated with the first filter and receiving the monochromatic light therefrom, said filter means having second, third, and fourth filters respectively passing the monochromatic light of different wave lengths depending on the angle of incidence of the monochromatic light from the first filter, and positioning means receiving light from one of the filters of the filter means for properly positioning the filter means relative to the first filter so that only the second filter passes the monochromatic light of the same wave length as passed by the first filter.

8. The follower system as defined in claim 7 in which the means for moving the first filter responds to the sun, and the follower system includes a solar energy panel movable with the filter means and arranged so that when the filter means is properly positioned relative to the first filter, the solar energy panel receives maximum radiation from the sun.

9. A follower system as defined in claim 7 in which the first filter and the filter means are mounted for rotation and the first filter includes means for rotating the first filter in response to a condition, and the filter means is rotated by the positioning means when the monochromatic light passes through the third and fourth filters.

10. A follower system as defined in claim 7 in which the positioning means includes a light sensitive sensor optically associated with each of the second, third and fourth filters to receive light therefrom and provide error signals when the third and fourth filters of the filter means in improperly positioned, and motor means responsive to the error signals and drivably connected to the filter means for driving the filter means to properly position the second filter to pass the monochromatic light to thereby null the error signal of the third and fourth filters.

11. A follower system as defined in claim 10 in which the light sensitive sensors are photocells and the positioning means includes a decoder connected to the photocells and providing an output corresponding to the error signals and the motor means is energized by the decoder output.

12. A follower system comprising light means providing a source of polychromatic light beams and interference filter means angularly movable relative to one another, an element movable with one of said means, the light means and filter means being arranged so that the filter means receives the beams of light from the light means and selectively transmits monochromatic light of different wave lengths corresponding to the angular position of the element as determined by the angle of incidence of the light beams from the light means on to the interference filter means, another angularly movable filter means arranged to follow movement of the element and optically associated with the interference filter means to receive monochromatic light therefrom for selectively passing the monochromatic light of a wave length depending on the position of the other filter means relative to the interference filter means, control means for utilizing the monochromatic light selectively passed by the other filter means as a measure of an angular relation of the interference filter means to the light means, means for positioning the other filter means relative to said interference filter means in response to the light passed thereby, and means operatively connecting said control means to said positioning means to cause the positioning means to angularly position the other filter means relative to the interference filter means so as to follow movement of the element.

References Cited
UNITED STATES PATENTS

| | | | |
|---|---|---|---|
| 3,078,372 | 2/1963 | Chase et al. | 250—203 |
| 3,084,261 | 4/1963 | Wilson | 250—203 |

JAMES W. LAWRENCE, *Primary Examiner.*

C. R. CAMPBELL, JR., *Assistant Examiner.*